US008276190B1

(12) United States Patent
Chang et al.

(10) Patent No.: US 8,276,190 B1
(45) Date of Patent: Sep. 25, 2012

(54) CROSS-DOMAIN AUTHENTICATION

(75) Inventors: Kevin Kai-Wei Chang, Azusa, CA (US); Nicholas Austin White, Marina del Rey, CA (US)

(73) Assignee: Google Inc., Mountain View, CA (US)

( * ) Notice: Subject to any disclaimer, the term of this patent is extended or adjusted under 35 U.S.C. 154(b) by 898 days.

(21) Appl. No.: 12/194,492

(22) Filed: Aug. 19, 2008

(51) Int. Cl.
*H04L 29/06* (2006.01)
(52) U.S. Cl. .............................. 726/3; 713/176; 726/22
(58) Field of Classification Search .................. 713/155, 713/156, 159, 168, 172, 183, 185; 726/1, 726/2, 3, 4, 5, 7, 8, 9, 19, 20, 27
See application file for complete search history.

(56) References Cited

U.S. PATENT DOCUMENTS

| 7,082,532 B1 * | 7/2006 | Vick et al. .................. 713/155 |
| 2005/0021791 A1 * | 1/2005 | Sakiyama et al. ............ 709/229 |
| 2007/0174905 A1 * | 7/2007 | Martherus et al. ................. 726/8 |

OTHER PUBLICATIONS

"What is OpenID?" OpenID, [online] [Retrieved on Dec. 22, 2008] Retrieved from the internet <URL:http://openid.net/what/>.
"OpenID," Wikipedia, Last modified Dec. 15, 2008, [online] [Retrieved on Dec. 22, 2008] Retrieved from the internet <URL:http://en.wikipedia.org/wiki/OpenID>.
Hodges, J., "Technical Comparison: OpenID and SAML-Draft 06," Jan. 17, 2006, [online] [Retrieved on Dec. 22, 2008] Retrieved from the internet URL:http://identitymeme.org/doc/draft-hodges-saml-openid-compare.html>, 24 Pages.
Mahemoff, M., "JSONP:JSON With Padding," Ajaxian, Dec. 12, 2005, [online] [Retrieved on Dec. 22, 2008] Retrieved from the internet <URL:http://ajaxian.com/archives/jsonp-json-with-padding>.
Strahl, R., "JSONP for cross-site Callbacks," Rick Strahl's Web Log, Jul. 4, 2007, [online] [Retrieved on Dec. 22, 2008] Retrieved from the internet <URL:http://www.westwind.com/Weblog/posts/107136.aspx>.
Tsyrklevich, E., et al., "Single Sign-On for the Internet: A Security Story," OpenID, 2007, 11 Pages.

* cited by examiner

*Primary Examiner* — Gilberto Barron, Jr.
*Assistant Examiner* — Izunna Okeke
(74) *Attorney, Agent, or Firm* — Fenwick & West LLP

(57) ABSTRACT

A user using a browser having stored authentication information for a web service in a first domain is authenticated to a web service in a second domain. The browser is provided with computer program instructions causing the browser to transparently provide the stored authentication information to the service in the first domain, receive cross-domain authentication credentials from the service in the first domain, and provide the cross-domain authentication credentials to the service in the second domain. The service in the second domain validates the cross-domain authentication credentials. If the credentials validate, the service in the second domain transparently provides the user with authenticated access.

22 Claims, 5 Drawing Sheets

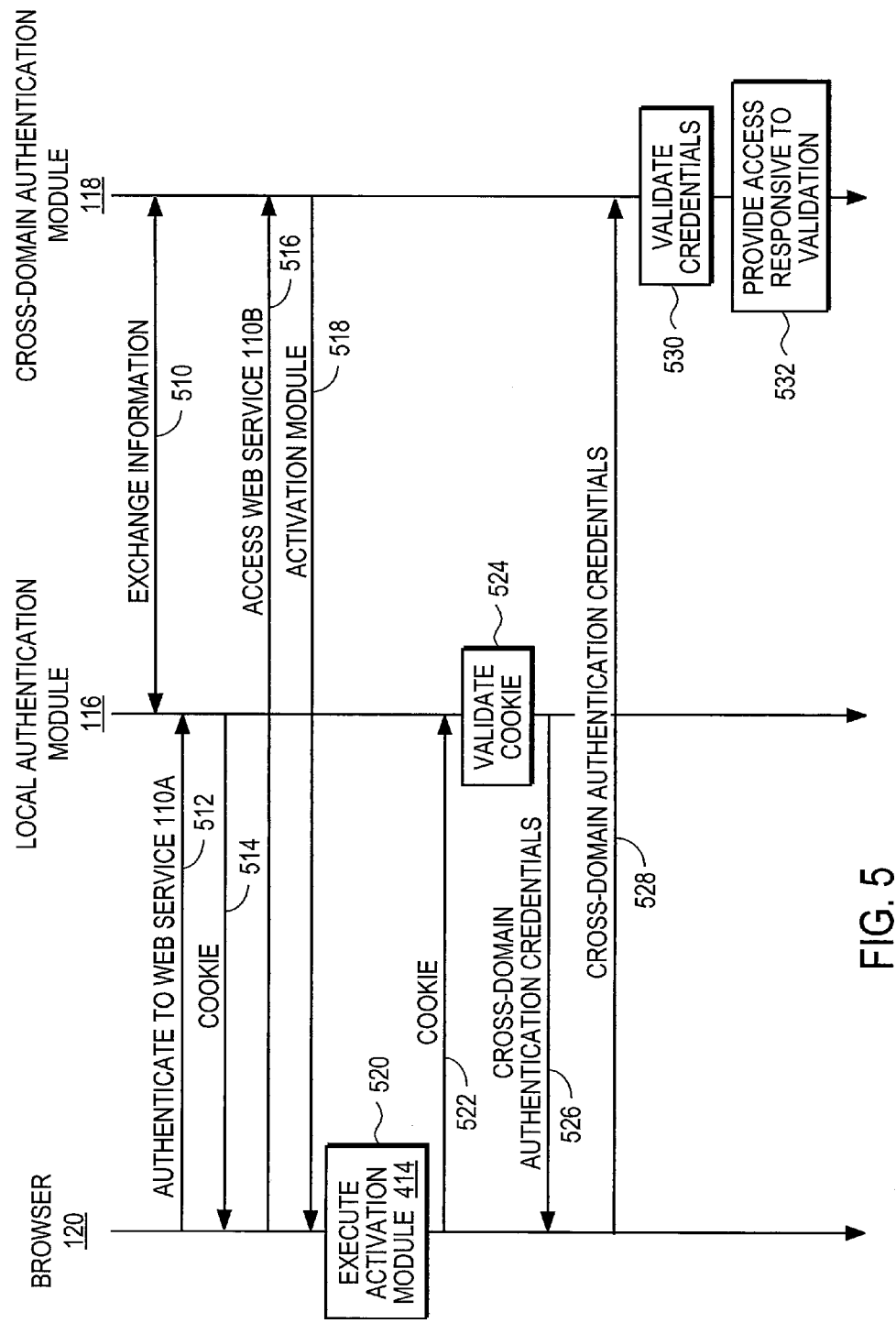

CROSS-DOMAIN AUTHENTICATION

BACKGROUND

1. Field of the Invention

This invention generally relates to authenticating users of network-based services and particular to authenticating users who use services in multiple domains.

2. Description of the Related Art

A web service provider may provide a variety of different services such as search, email, video sharing, and social networking. Typically, a user can authenticate to one of these services, and then have the authentication carry over to other services from the same provider. For example, a user can provide a username and password as part of a login to an email service, and then access a social networking service from the same provider in the same domain without providing additional information.

The web service provider usually enables this single-authentication ability by providing a cookie to the user's web browser in response to a successful authentication. The cookie identifies the user and contains data indicating that the user has successfully authenticated to a service from the provider. The user's browser automatically provides the cookie to the provider's web sites when the user contacts those sites to obtain the services.

The cookie-based technique described above is effective when the services accessed by the user are all within the same second-level Internet domain. For example, if the user authenticates to the mail service available at the domain "mail.google.com," the cookie received from that service can also be used to automatically authenticate the user to the video sharing service available at "video.google.com." These two services are both within the same second-level "google.com" domain.

However, the technique is ineffective when the services are located in different second-level domains. Browser security policies generally prevent a service in a first domain from accessing cookies created by a service in a second, different, second-level domain. Thus, the service in the first domain cannot determine whether a given user has already authenticated to a service in the second domain provided by the same provider. As a result, a service provider oftentimes must require an independent authentication for a service located in a different domain than the provider's other services. This separate authentication is inconvenient for the user and also consumes computing resources of the provider.

SUMMARY

The problem described above is addressed by a method, computer system, and computer-readable storage medium for authenticating a user to a web service in a second domain, the user using a browser having stored authentication information for a web service in a first domain. Embodiments of the method comprise providing the browser with computer program instructions causing the browser to transparently: provide the stored authentication information to the web service in the first domain, receive cross-domain authentication credentials from the web service in the first domain, and provide the cross-domain authentication credentials to the web service in the second domain. In addition, the method comprises validating the cross-domain authentication credentials and providing the user with authenticated access to the web service in the second domain responsive at least in part to successful validation of the cross-domain authentication credentials.

Embodiments of the computer system and computer-readable storage medium comprise a cross-domain interaction module configured to provide the browser with computer program instructions causing the browser to transparently: provide the stored authentication information to the web service in the first domain, receive cross-domain authentication credentials from the web service in the first domain and provide the cross-domain authentication credentials to the web service in the second domain. In addition, embodiments further comprise a credentials validation module configured to validate the cross-domain authentication credentials and an access control module configured to provide the user with authenticated access to the web service in the second domain responsive at least in part to successful validation of the cross-domain authentication credentials.

Embodiments of the method also comprise receiving an activation module having computer program instructions for transparently performing cross-domain authentication of the user and executing the activation module. Responsive at least in part to execution of the activation module, the method further comprises providing the stored authentication information to the web service in the first domain, receiving cross-domain authentication credentials from the web service in the first domain, and providing the cross-domain authentication credentials to the web service in the second domain.

BRIEF DESCRIPTION OF THE DRAWINGS

FIG. 5 is a sequence diagram illustrating steps involved in performing cross-domain authentication of a user according to one embodiment.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
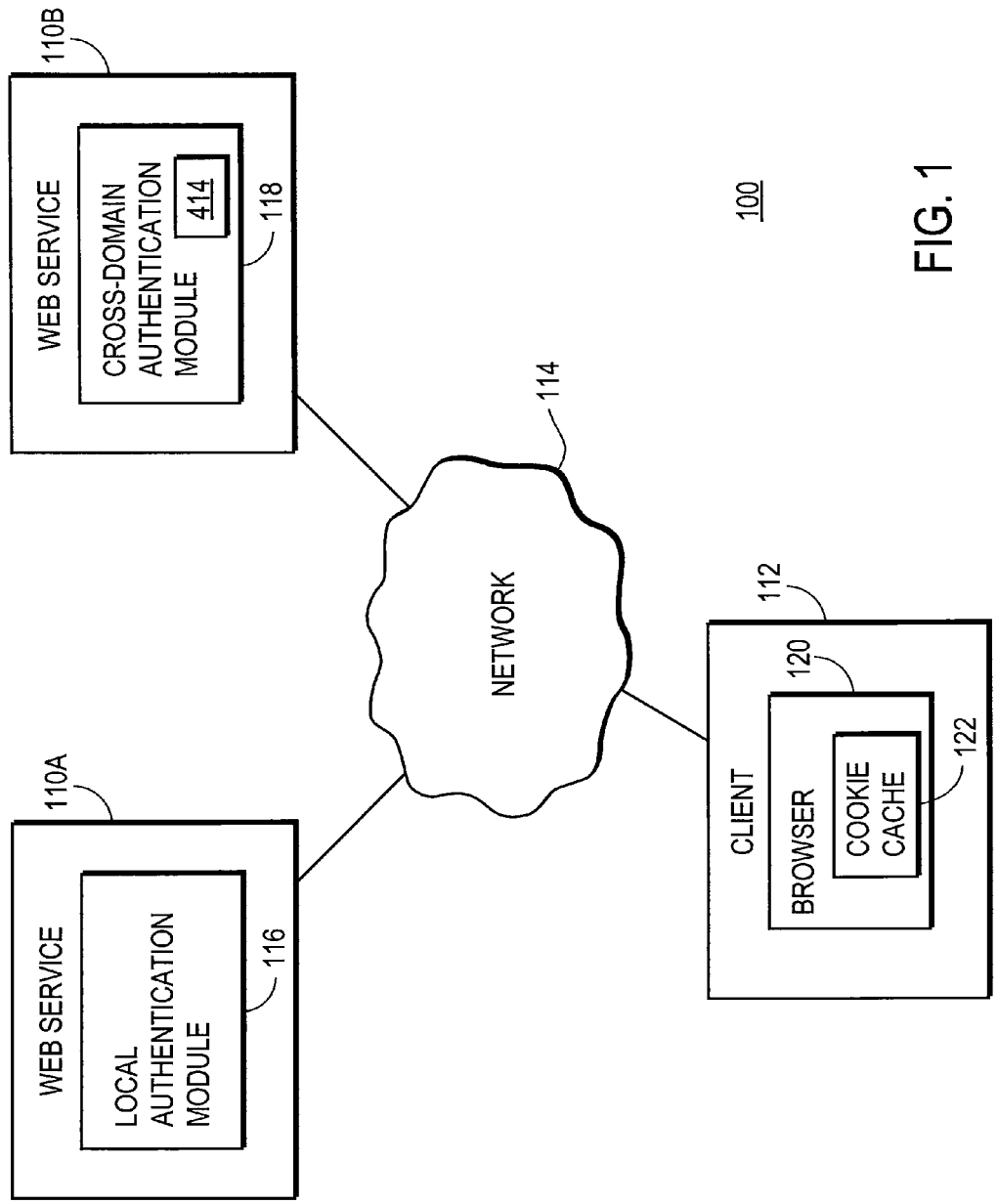
FIG. 1 is a high-level block diagram of a computing environment according to one embodiment.

FIG. 1 is a high-level block diagram of a computing environment 100 according to one embodiment. FIG. 1 illustrates two web services 110A, 110B and a client 112 connected by a network 114. Only two web services 110 and one client 112 are shown in FIG. 1 in order to simplify and clarify the description. Embodiments of the computing environment 100 can have thousands or millions of clients 112, as well as multiple web services, connected to the network.

The client 112 is a computer or other electronic device used by one or more users to perform activities including accessing the web services 110A, 110B. The client 112, for example, can be a personal computer, personal digital assistant (PDA), or a mobile telephone. As shown in FIG. 1, the client 112 executes a web browser 120 that allows the user to retrieve and view web pages from the web sites providing the web services 110, and submit information to the web sites. In one embodiment, the browser 120 is a conventional web browser, such as MICROSOFT INTERNET EXPLORER or MOZILLA FIREFOX. The browser 120 supports technologies including JAVASCRIPT that allow the client 112 to perform actions in response to scripts and other data sent to the browser 112 by the web services 110. In one embodiment, the browser 120 maintains a cookie cache 122 that stores cookies associated with the web services 110 on the network 114.

The web services 110 provide services to users of the clients 112. For example, the services can include without limitation content searching, email, mapping, content sharing, shopping, financial information, blogging, calendaring, discussion groups, and/or social networking. The web services 110 are implemented by one or more web servers provided by a service provider. In one embodiment, the two web services 110A, 110B illustrated in FIG. 1 are provided by the same service provider, although this is not necessarily the case.

Each web service 110 provides a specific set of services that users can access. Generally, an authenticated (i.e., logged in) user has access to all or many of the services in the set, while an unauthenticated user has access to only a subset of the services. For example, at a video sharing site an authenticated user can access services allowing the user to search for and view videos, upload videos, and comment on videos. However, unauthenticated users can only search for and view videos.

For purposes of this description, assume that the two web services 110A, 110B are located in different Internet domains. "Different domains" as used herein, refers to the web services 110A, 110B being in different second-level Internet domains. For example, web service 110A can be the email service located at "mail.google.com" while web service 110B can be the video sharing service located at "www.youtube.com." These two web services are located at the same top-level domain, ".com" but are considered to be located at different domains because they have different second-level domains, i.e. "google" and "youtube." A browser 120 can access the web services 110 via a uniform resource locator (URL), such as "http://www.youtube.com." Specific services provided by the web services 110 can be accessed using specific URLs. For example, a login service provided by web service 110A can be located at https://www.google.com/accounts/ServiceLogin? . . . "

One of the web services 110A includes a local authentication module 116. This module 116 allows a user of a client 112 to authenticate to the web service 110A by, for example, providing a valid username and password. Upon successful authentication, the local authentication module 116 provides the client 112 with a cookie storing authentication information establishing that the user is authenticated. The client 112 stores the cookie and automatically provides it to other web services in the same domain as the local authentication module 116. These other services can use the cookie to identify the user and determine whether the user is authenticated. Oftentimes, the cookie is valid for only a limited time.

The other web service 110B includes a cross-domain authentication module 118. In one embodiment, the cross-domain authentication module 118 provides each client 112 that accesses web service 110B with an activation module 414 that causes the client to access the local authentication module 116 of the other web service 110A. If the client 112 has a cookie from the other web service 110A, the client provides it to the local authentication module 116 during the interaction caused by the activation module 414. Further, if a provided cookie is valid, the local authentication module 116 provides the client 112 with cross-domain authentication credentials. The client 112 presents these credentials to the cross-domain authentication module 118, which validates the credentials using information shared with the local authentication module 116 of web service 110A and logs the user into web service 110B. The actions performed by the cross-domain authentication module 118 occur transparently and automatically. Thus, a user who authenticates to web service 110A and then visits web service 110B is automatically authenticated to the latter web service, even though the two web services are in different domains and unable to directly access the same cookies.

The network 114 enables communications among the entities connected to it. In one embodiment, the network 114 is the Internet and uses standard communications technologies and/or protocols. Thus, the network 114 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 114 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Figure 2:
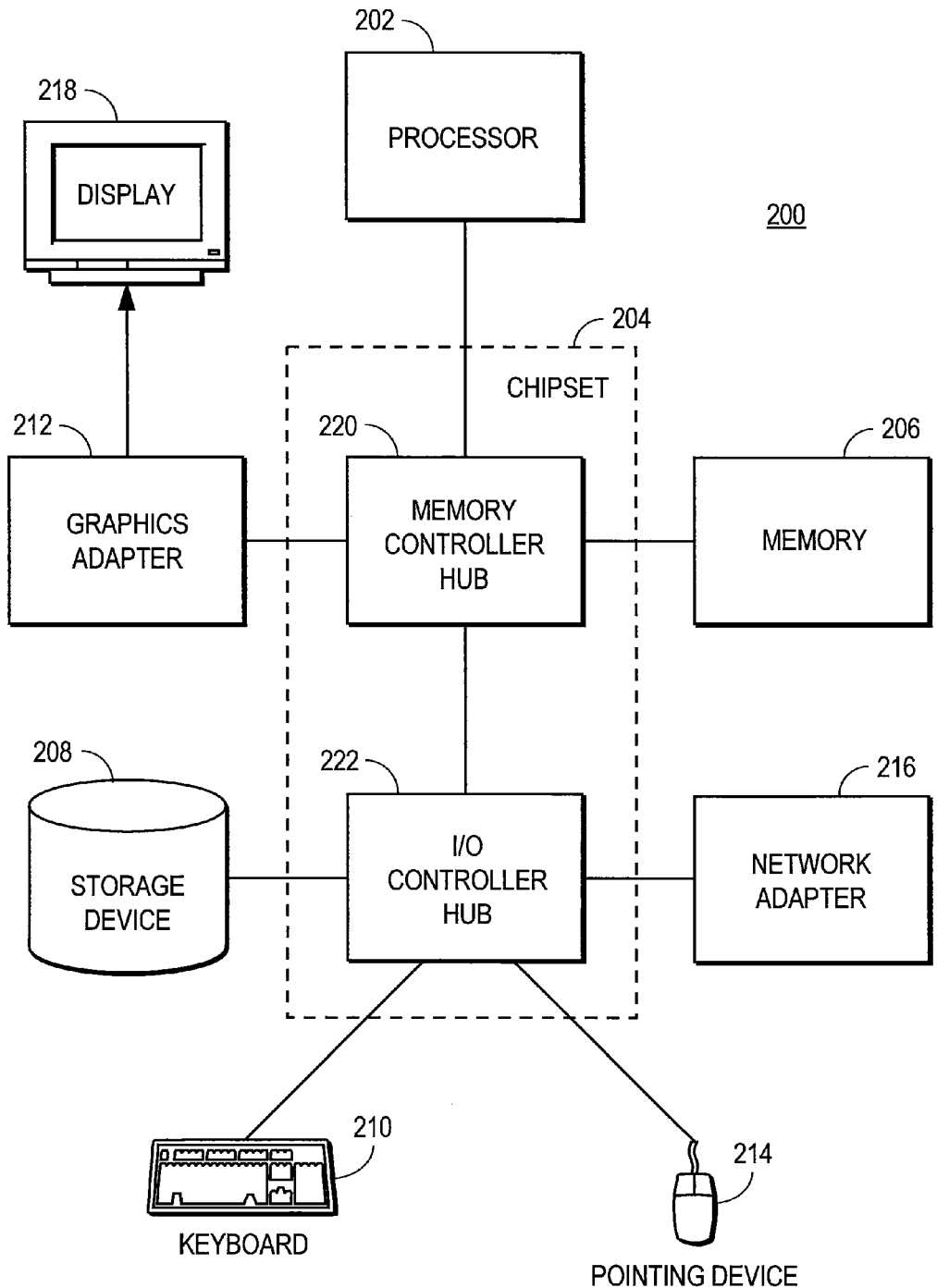
FIG. 2 is a high-level block diagram illustrating an example of a computer for use as a web server providing the web services and/or as a client.

FIG. 2 is a high-level block diagram illustrating an example of a computer 200 for use as a web server providing the web services 110 and/or as a client 112. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to the network 114. Some embodiments of the computer 200 have different and/or other components than those shown in FIG. 2.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, a client 112 that is a mobile telephone typically has limited processing power, a small display 218, and might lack a pointing device 214. A server providing a web service 110, in contrast, might comprise multiple blade servers working together to provide the functionality described herein.

Figure 3:
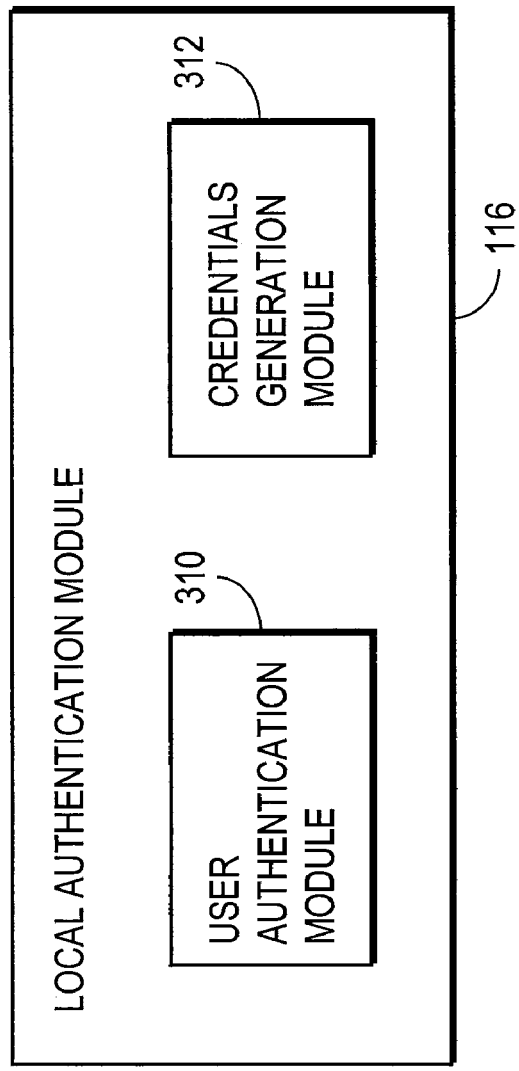
FIG. 3 is a high-level block diagram illustrating a detailed view of modules within the local authentication module according to one embodiment.

FIG. 3 is a high-level block diagram illustrating a detailed view of modules within the local authentication module 116 according to one embodiment. Some embodiments of the local authentication module 116 have different and/or other modules than the ones described here. Similarly, the functions can be distributed among the modules in accordance with other embodiments in a different manner than is described here. Depending upon the embodiment, certain modules can be incorporated into other modules of web service 110A and/or other entities on the network 114. In one embodiment, services provided by different modules are accessed using different URLs that reference locations within the same second level domain.

A user authentication module 310 authenticates users of the web service 110A. In one embodiment, the user authentication module 310 provides a user with a web page allowing the user to submit a username and password and/or other authentication credentials. Upon receipt of the credentials, the user authentication module 310 validates the credentials against stored credentials. If the credentials validate, the user authentication module 310 authenticates the user and the web service 110A provides the user with access to the set of services available to authenticated users.

In one embodiment, the user authentication module 310 issue a cookie to the browser 120 of a user that has successfully authenticated. As mentioned above, the cookie stores information establishing that the user is authenticated. This information can be encrypted to prevent tampering and/or fraud. In addition, the information can specify a validity period for the cookie and/or the authentication.

During normal operation, the user's browser 120 sends this cookie to the web service 110A during interactions with the web service. The user authentication module 310 detects receipt of the cookie and validates the information within it to establish the identity and authentication status of the user. If the cookie is valid, the user authentication module 310 allows the user to access the set of services available to authenticated users.

The local authentication module 116 also includes a credentials generation module 312. In one embodiment, the credentials generation module 312 receives cookies from clients 112 engaged in cross-domain authentication using the activation module 414. The credentials generation module 312 receives the cookie for web service 110A from the browser 120 and validates it. If the cookie is valid, the credentials generation module 312 provides the browser 120 with cross-domain authentication credentials. In one embodiment, the credentials for cross-domain authentication are similar to the information contained in a cookie and include information identifying the user, establishing that the user is authenticated, and describing a validity period. If the cookie is not present or is otherwise invalid, the credentials generation module 312 provides the browser 120 with a value indicating that authentication failed.

Figure 4:
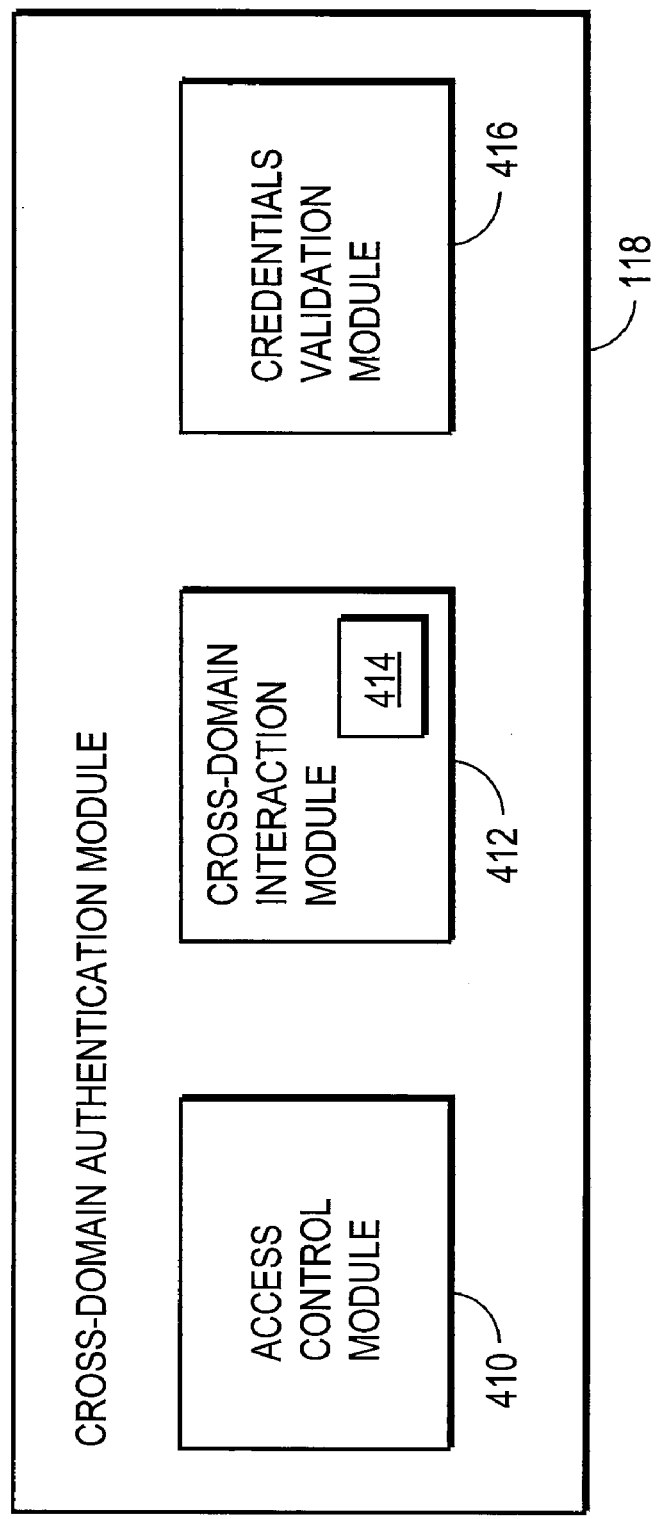
FIG. 4 is a high-level block diagram illustrating a detailed view of modules within the cross-domain authentication module according to one embodiment.

FIG. 4 is a high-level block diagram illustrating a detailed view of modules within the cross-domain authentication module 118 of web service 110B according to one embodiment. Some embodiments of the cross-domain authentication module 118 have different and/or other modules than the ones described here. Similarly, the functions can be distributed among the modules in accordance with other embodiments in a different manner than is described here. Depending upon the embodiment, certain modules can be incorporated into other modules of web service 110B and/or other entities on the network 114. In one embodiment, services provided by different modules are accessed using different URLs that reference locations within the same second level domain.

An access control module 410 controls user access to the services provided by the web service 110B. In one embodiment, the access control module 410 provides different levels of access to users depending upon whether the users are authenticated. As mentioned above, the access control module 410 typically provides authenticated users with broader access to the available services than it provides to unauthenticated users. As used herein, "authenticated access" refers to the access to services provided to authenticated users while "unauthenticated access" refers to the access provided to unauthenticated users. For example, at a video sharing site a user with authenticated access can access services allowing the user to search for and view videos, upload videos, and comment on videos. However, a user with unauthenticated access can only search for and view videos.

A cross-domain interaction module 412 performs cross-domain authentication of a user accessing web service 110B. In one embodiment, this module 412 performs the cross-domain authentication if the user has recently been authenticated to web service 110A and has a valid cookie evidencing the authentication. For example, if the user authenticates to web service 110A and then browses to web service 110B, the cross-domain interaction module 412 effects an authentication of the user so that the user is seamlessly authenticated by web service 110B.

In one embodiment, the cross-domain interaction module 412 operates automatically and transparently. "Transparently," as used herein, means that the operation of the cross-domain interaction module 412 is not apparent to the user. The user can be unaware that a cross-domain authentication is occurring and there is no explicit user authentication (i.e., login) to web service 110B. In some embodiments, the operation of the cross-domain interaction module 412 is hidden and thus not easily detectable by the end-user. In other embodiments, the user may be aware that cross-domain authentication is occurring but not aware of the specific actions being performed by the cross-domain interaction module 412.

In some embodiments, the cross-domain authentication requires a small amount of time to perform the authentication (e.g., five seconds). Therefore, the access control module 410 briefly provides the user with unauthenticated access until the cross-domain authentication occurs. Once the authentication occurs, the access control module 410 automatically provides the user with authenticated access.

An embodiment of the cross-domain interaction module 412 performs the authentication by causing the user's browser 120 to provide the cookie from web service 110A to the credentials generation module 312 of that web service. The browser 120 receives the cross-domain authentication credentials in response to providing the cookie, and then provides these credentials to web service 110B. Different embodiments can use a variety of different techniques to perform these functions.

In one embodiment, the cross-domain interaction module 412 provides an activation module 414 to the user's browser 120. The activation module 414 is embedded within the home page of the web server providing web service 110B and therefore automatically downloaded to every browser that accesses the web service. The activation module 414 is executed by the user's browser 120 and causes the cross-domain authentication to occur.

An embodiment of the activation module 414 contains JAVASCRIPT code that uses JAVASCRIPT Object Notation with Padding (JSONP) to cause the browser 120 to provide the cookie for web service 110A to the credentials generation module 312 and receive a value in response. To effect the JSONP transaction, the JAVASCRIPT code dynamically inserts a <script> tag its HTML web page. The tag includes a "src" attribute that references the URL of the credentials generation module 312 of web service 110A, provides parameters describing the data desired to returned by that module, and the name of a callback function. When the browser 120 loads the <script> tag during processing of the web page, the browser 120 requests the specified data from the credentials generation module 312 of web service 110A at the referenced URL during processing of the "src" attribute. The browser 120 inherently provides the cookie for web service 110A to the credentials generation module 312 as part of this request. The credentials generation module 312, in turn, validates the cookie and returns a value containing either the cross-domain authentication credentials or a failure message. The browser 120 calls the specified callback function and provides the JAVASCRIPT code with the returned value.

In another embodiment, the activation module 414 uses techniques based on inline frames (iframes) to perform cross-domain information sharing. An iframe is an HTML element that allows one HTML document to be embedded inside another HTML document. In this embodiment, JAVASCRIPT code in the activation module 414 causes the browser 120 to open a document from a URL referencing the credentials generation module 312 of web service 110A within the home page or another document from web service 110B. The activation module 414 then passes the authentication information between the frames. This information sharing occurs, for example, by using the iframe's anchor locations to represent information, and selectively moving the iframe to new locations. The iframe can be hidden so that it is not visible to the user.

The activation module 414 provides the value returned by the credentials generation module 312 to a credentials validation module 416 in the cross-domain authentication module 118 of web service 110B. Generally, the value will represent either the cross-domain authentication credentials for the user or a failure message. If the value represents cross-domain authentication credentials, the credentials validation module 416 validates the credentials. In one embodiment, the credentials validation module 416 engages in back-channel communications with the credentials generation module 312 and/or other modules within the local authentication module 116 in order to obtain information used to validate the credentials, such as encryption keys. If validation is successful, the credentials validation module 416 interacts with the access control module 410 to authenticate the user and thereby login the user to the web service 110B. If validation is unsuccessful or the value returned by the credentials generation module 312 indicates a failure to authenticate the user, the credentials validation module 416 interacts with the access control module 410 to provide the user with only the restricted services available to unauthenticated users.

FIG. 5 is a sequence diagram illustrating steps involved in performing cross-domain authentication of a user according to one embodiment. In the diagram, three vertical lines respectively represent the browser 120 at the client 112, the local authentication module 116, and the cross-domain authentication module 118. Time flows from the top to the bottom of the figure and the horizontal lines between the entities represent communications. Boxes on the lines represent activities performed by the associated entity. Other embodiments can perform the steps of FIG. 5 in different orders. Moreover, other embodiments can include different and/or additional steps and communications than the ones described here.

The local authentication module 116 and cross-domain authentication module 118 exchange 510 information. The exchanged information allows the cross-domain authentication module 118 to validate credentials issued by the local authentication module 116. For example, the exchanged information can include encryption/decryption keys used to encrypt and decrypt the credentials, a schema describing a format of the credentials, etc. This information exchange is illustrated at the beginning of the sequence diagram for purposes of clarity. However, the exchange need not occur first and can occur at a later point in the sequence and/or at multiple points.

The user uses the browser 120 to access the web service 110A having the local authentication module 116. During this access, the user authenticates 512 to the local authentication module 116. For example, this authentication can occur when the user logs into a web site provided by web service 110A. Once the user successfully authenticates, the local authentication module 116 sends 514 the user's browser 120 a cookie having stored authentication information. The browser 120 stores the cookie and automatically provides it to web services in the same domain as web service 110A when requesting web pages or other content.

The user uses the browser 120 to access 516 the web service 110B having the cross-domain authentication module 118. The web service 110B provides the user with one or more web pages that allow the user to use the services provided by the web service. These web pages provide 510 the user with unauthenticated access to the services. Contemporaneously and transparently, cross-domain authentication is initiated 512. This initiation can occur, for example, by providing 518 an activation module 414 in the home page of web service 110B that is automatically downloaded to the browser 120.

The browser 120 executes 520 the activation module 414. This execution causes the browser 120 to provide 522 the user's cookie for web service 110A, if it exists, to the local authentication module 116 of that web service. The local authentication module 116 validates 524 the cookie. If the cookie validates, the local authentication module 116 provides 526 the browser 120 with cross-domain authentication credentials. If the cookie does not validate, the local authentication module 116 provides the browser with a value indicating a failure to authenticate the user.

The activation module 414 causes the browser 120 to provide 528 the cross-domain authentication credentials (or failure value) to the cross-domain authentication module 118 of web service 110B. The cross-domain authentication module 118 validates 530 the cross-domain authentication credentials. If the validation is successful, the user is authenticated (logged in) to web service 110B and provided 532 with authenticated access to its services. If the validation is unsuccessful, the user is provided 532 with unauthenticated access to its services.

The above description is included to illustrate the operation of the embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of authenticating a user to a web service in a second domain, the user using a browser having a stored browser authentication cookie issued by a web service in a first domain, wherein the first domain and the second domain are different second-level Internet domains, and wherein the browser is configured to prevent the web service in the second domain from accessing a cookie created by the web service in the first domain, the method comprising:
   the web service in the second domain providing the browser with computer program instructions causing the browser to transparently:
      provide the stored browser authentication cookie to the web service in the first domain;
      receive, responsive to successful validation of the browser authentication cookie by the web service in the first domain, cross-domain authentication credentials from the web service in the first domain; and
      provide the cross-domain authentication credentials to the web service in the second domain;
   validating the cross-domain authentication credentials; and
   providing the user with authenticated access to the web service in the second domain responsive at least in part to successful validation of the cross-domain authentication credentials.

2. The method of claim 1, further comprising:
   providing the user with unauthenticated access to the web service in the second domain responsive at least in part to unsuccessful validation of the cross-domain authentication credentials.

3. The method of claim 1, wherein the computer program instructions provided to the browser are embedded within a web page provided to the browser by the web service in the second domain.

4. The method of claim 1, wherein the computer program instructions provided to the browser comprise instructions that, when executed by the browser, dynamically insert a <script> tag into a web page, the <script> tag including a "src" attribute that references a uniform resource locator of a service of the web service in the first domain to which the stored browser authentication cookie is provided.

5. The method of claim 1, wherein the computer program instructions provided to the browser comprise instructions that, when executed by the browser, cause the browser to create an inline frame (iframe) referencing a uniform resource locator of a service of the web service in the first domain and use the iframe to provide the stored browser authentication cookie to the service in the first domain and receive the cross-domain authentication credentials in response thereto.

6. The method of claim 1, wherein the computer program instructions cause the browser to provide the stored browser authentication cookie, receive the cross-domain authentication credentials, and provide the cross-domain authentication credentials automatically.

7. A computer system for authenticating a user to a web service in a second domain, the user using a browser having a stored browser authentication cookie issued by a web service in a first domain, wherein the first domain and the second domain are different second-level Internet domains, and wherein the browser is configured to prevent the web service in the second domain from accessing a cookie created by the web service in the first domain, comprising: a processor for executing computer program instructions;
   a non-transitory computer-readable storage medium storing executable computer program instructions comprising:
      a cross-domain interaction module configured to provide the browser with computer program instructions causing the browser to transparently: provide the stored browser authentication cookie to the web service in the first domain; receive, responsive to successful validation of the browser authentication cookie by the web service in the first domain, cross-domain authentication credentials from the web service in the first domain; and provide the cross-domain authentication credentials to the web service in the second domain; a credentials validation module configured to validate the cross-domain authentication credentials; and an access control module configured to provide the user with authenticated access to the web service in the second domain responsive at least in part to successful validation of the cross-domain authentication credentials.

8. The computer system of claim 7, wherein the access control module is further configured to provide the user with unauthenticated access to the web service in the second domain responsive at least in part to unsuccessful validation of the cross-domain authentication credentials.

9. The computer system of claim 7, wherein the computer program instructions provided to the browser are embedded within a web page.

10. The computer system of claim 7, wherein the computer program instructions provided to the browser comprise instructions that, when executed by the browser, dynamically insert a <script> tag into a web page, the <script> tag including a "src" attribute that references a uniform resource locator of a service of the web service in the first domain to which the stored browser authentication cookie is provided.

11. The computer system of claim 7, wherein the computer program instructions provided to the browser comprise instructions that, when executed by the browser, cause the browser to create an inline frame (iframe) referencing a uniform resource locator of a service of the web service in the first domain and use the iframe to provide the stored browser authentication cookie to the service in the first domain and receive the cross-domain authentication credentials in response thereto.

12. The computer system of claim 7, wherein the computer program instructions cause the browser to provide the stored browser authentication cookie, receive the cross-domain authentication credentials, and provide the cross-domain authentication credentials automatically.

13. A non-transitory computer-readable storage medium storing executable computer program instructions for authenticating a user to a web service in a second domain, the user using a browser having a stored browser authentication cookie issued by a web service in a first domain, wherein the first domain and the second domain are different second-level Internet domains, and wherein the browser is configured to prevent the web service in the second domain from accessing a cookie created by the web service in the first domain, the instructions comprising:
   a cross-domain interaction module configured to provide the browser with computer program instructions causing the browser to transparently:
      provide the stored browser authentication cookie to the web service in the first domain;
      receive, responsive to successful validation of the browser authentication cookie by the web service in the first domain, cross-domain authentication credentials from the web service in the first domain; and provide the cross-domain authentication credentials to the web service in the second domain;

a credentials validation module configured to validate the cross-domain authentication credentials; and an access control module configured to provide the user with authenticated access to the web service in the second domain responsive at least in part to successful validation of the cross-domain authentication credentials.

14. The non-transitory computer-readable storage medium of claim 13, wherein the access control module is further configured to provide the user with unauthenticated access to the web service in the second domain responsive at least in part to unsuccessful validation of the cross-domain authentication credentials.

15. The non-transitory computer-readable storage medium of claim 13, wherein the computer program instructions provided to the browser are embedded within a web page.

16. The non-transitory computer-readable storage medium of claim 13, wherein the computer program instructions provided to the browser comprise instructions that, when executed by the browser, dynamically insert a <script> tag into a web page, the <script> tag including a "src" attribute that references a uniform resource locator of a service of the web service in the first domain to which the stored browser authentication cookie is provided.

17. The non-transitory computer-readable storage medium of claim 13, wherein the computer program instructions provided to the browser comprise instructions that, when executed by the browser, cause the browser to create an inline frame (iframe) referencing a uniform resource locator of a service of the web service in the first domain and use the iframe to provide the stored browser authentication cookie to the service in the first domain and receive the cross-domain authentication credentials in response thereto.

18. The non-transitory computer-readable storage medium of claim 13, wherein the computer program instructions cause the browser to provide the stored browser authentication cookie, receive the cross-domain authentication credentials, and provide the cross-domain authentication credentials automatically.

19. A method of authenticating a user to a web service in a second domain, the user using a browser having stored authentication information for a web service in a first domain, wherein the first domain and the second domain are different second-level Internet domains, and wherein the browser is configured to prevent the web service in the second domain from accessing a cookie created by the web service in the first domain, the method comprising:

receiving an activation module having computer program instructions for transparently performing cross-domain authentication of the user;

executing the activation module; and responsive at least in part to execution of the activation module:

providing the stored authentication information to the web service in the first domain;

receiving cross-domain authentication credentials from the web service in the first domain; and providing the cross-domain authentication credentials to the web service in the second domain.

20. The method of claim 19, wherein the user obtains authenticated access to the web service in the second domain responsive at least in part to successful validation of the cross-domain authentication credentials by the web service in the second domain.

21. The method of claim 19, wherein the activation module comprises computer program instructions that, when executed by the browser, dynamically insert a <script> tag into a web page, the <script> tag including a "src" attribute that references a uniform resource locator of a service of the web service in the first domain to which the stored authentication information is provided.

22. The method of claim 19, wherein the activation module is received responsive at least in part to the browser requesting access to a service provided by the web service in the second domain.

* * * * *